(12) United States Patent
Thompson

(10) Patent No.: US 7,584,980 B2
(45) Date of Patent: Sep. 8, 2009

(54) FOLD UP/FOLD DOWN TOW DOLLY FOR USE WITH A LOAD BEARING VEHICLE HITCH

(76) Inventor: Michael Thompson, 4011 Ledgestone, Waterford, MI (US) 48329

( * ) Notice: Subject to any disclaimer, the term of this patent is extended or adjusted under 35 U.S.C. 154(b) by 585 days.

(21) Appl. No.: 11/391,602

(22) Filed: Mar. 28, 2006

(65) Prior Publication Data

US 2007/0235985 A1 Oct. 11, 2007

(51) Int. Cl.
*B60P 3/06* (2006.01)
*B62D 53/04* (2006.01)
(52) U.S. Cl. ........................ 280/402; 280/656
(58) Field of Classification Search ................ 280/402, 280/476.1, 491.1, 491.3, 656
See application file for complete search history.

(56) References Cited

U.S. PATENT DOCUMENTS

| | | | |
|---|---|---|---|
| 3,311,245 A * | 3/1967 | Galey | 414/537 |
| 3,841,506 A * | 10/1974 | Smith | 414/563 |
| 3,877,714 A | 4/1975 | Black | |
| 3,979,137 A * | 9/1976 | Lipscomb et al. | 280/402 |
| 3,997,186 A * | 12/1976 | Pottorff | 280/402 |
| 4,087,008 A | 5/1978 | Silva, Jr. | |
| 4,239,258 A | 12/1980 | Burris | |
| 4,362,316 A | 12/1982 | Wright et al. | |
| 4,480,851 A | 11/1984 | St-Pierre et al. | |
| 4,483,549 A * | 11/1984 | Nikawa | 280/402 |
| 4,529,220 A | 7/1985 | Wright et al. | |
| 4,664,399 A | 5/1987 | Mobley et al. | |
| 4,746,142 A | 5/1988 | Davis | |
| 4,768,806 A | 9/1988 | Tetreault et al. | |
| 4,822,069 A | 4/1989 | Burgess | |
| 4,846,484 A | 7/1989 | Nekola | |
| 5,224,728 A * | 7/1993 | Ball | 280/476.1 |
| 5,228,712 A * | 7/1993 | Speier | 280/401 |
| 5,340,145 A | 8/1994 | Leib et al. | |
| 5,342,162 A | 8/1994 | Robinette et al. | |
| 5,727,920 A | 3/1998 | Hull et al. | |
| 5,743,541 A | 4/1998 | Cook | |

(Continued)

FOREIGN PATENT DOCUMENTS

JP   6239174   8/1994

(Continued)

*Primary Examiner*—Lesley D Morris
*Assistant Examiner*—Marc A. Scharich
(74) *Attorney, Agent, or Firm*—Gifford, Krass, Sprinkle, Anderson & Citkowski, P.C.

(57) ABSTRACT

A convertible tow dolly supported upon a towing vehicle when in an elevated and non-use position. The dolly includes an elongated tubular support having a first end pivotally secured to a first bracket fixedly engaged to a hitch associated with a towing vehicle. A wheeled and crosswise extending portion exhibits a secondary bracket which is pivotally secured a second end of the elongated tubular support and which is locked into position to prevent up and down articulation relative to the brackets and for supporting a towed vehicle upon the crosswise extending portion in a use position. The elongated support is unlocked at the brackets, such as by removal of first and second clevis pins, to permit folding about the first and second pivotal connections and in a direction towards the towing vehicle, concurrent with elevating the wheeled and crosswise extending portion to a subsequently locked and non-use position.

16 Claims, 6 Drawing Sheets

U.S. PATENT DOCUMENTS

| | | | |
|---|---|---|---|
| 5,813,824 A * | 9/1998 | Zanzig et al. | 414/809 |
| 6,164,897 A | 12/2000 | Edwards | |
| 6,179,368 B1 | 1/2001 | Karlsson | |
| 6,623,028 B1 | 9/2003 | Johnston et al. | |
| 6,767,025 B2 | 7/2004 | Hagen | |
| 6,846,003 B2 | 1/2005 | Thompson | |
| 6,902,179 B1 | 6/2005 | Jolly | |
| 6,955,375 B2 | 10/2005 | Thurm | |
| 7,083,182 B2 * | 8/2006 | Clayton et al. | 280/402 |
| 2005/0058529 A1 * | 3/2005 | Stidd | 414/563 |

FOREIGN PATENT DOCUMENTS

| | | |
|---|---|---|
| WO | WO9413509 | 6/1994 |
| WO | WO9912800 | 3/1999 |

\* cited by examiner

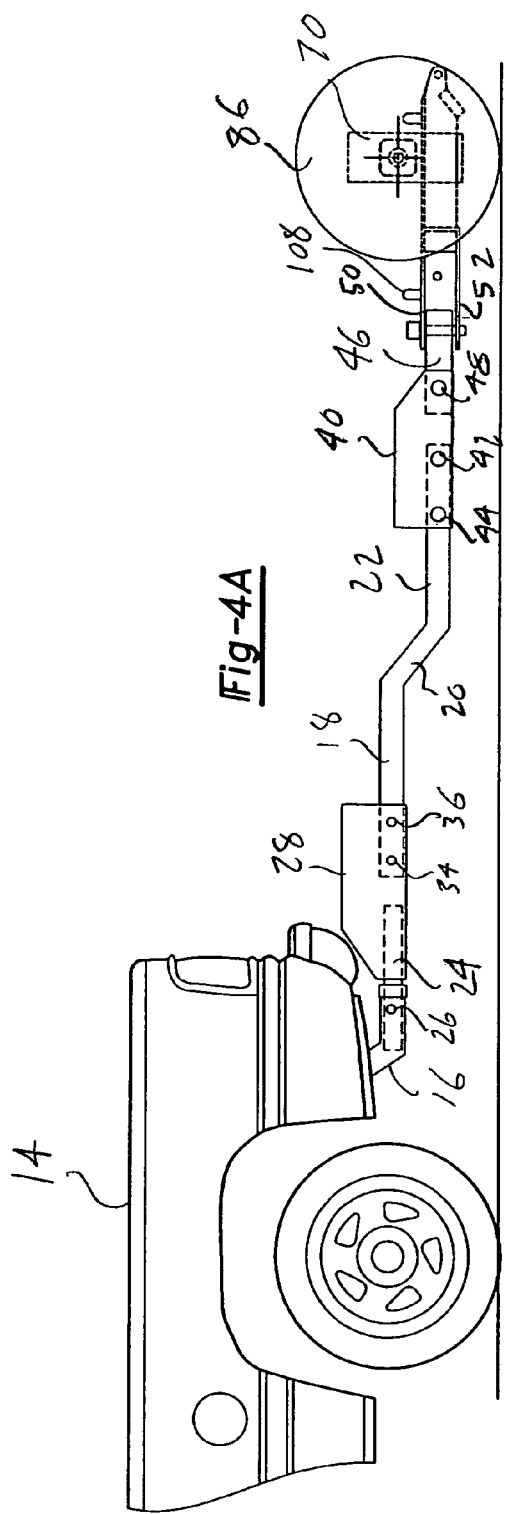
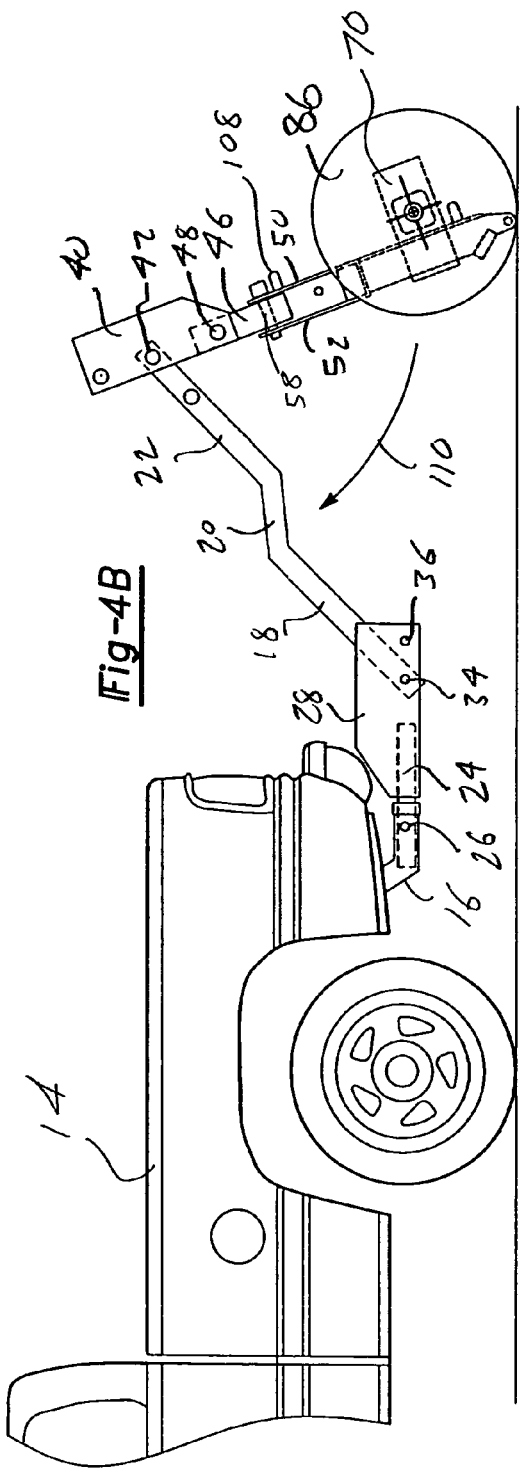

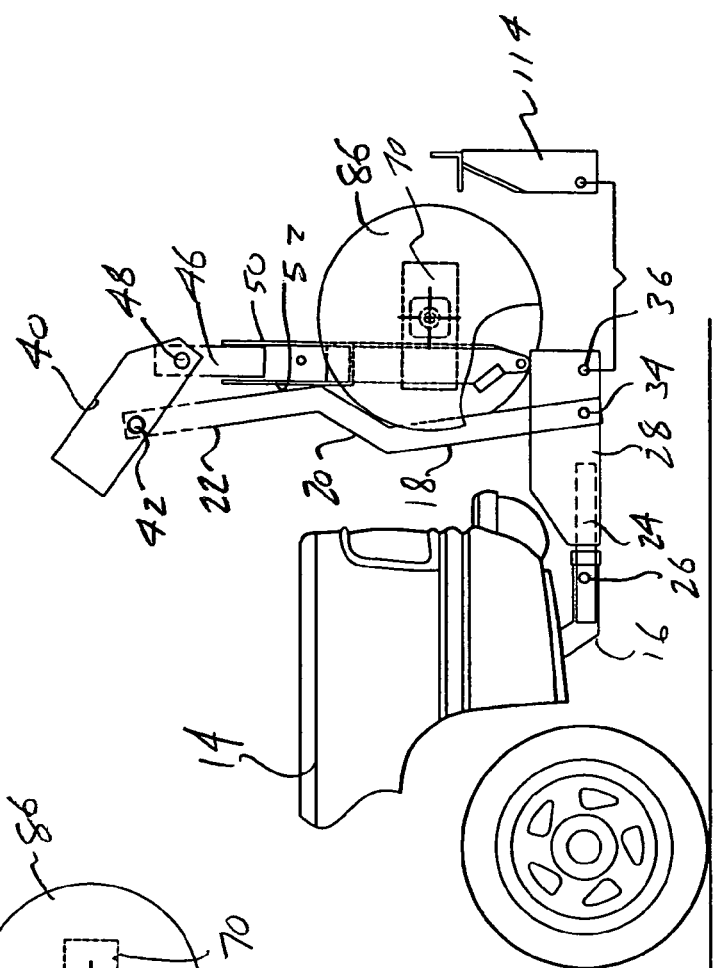
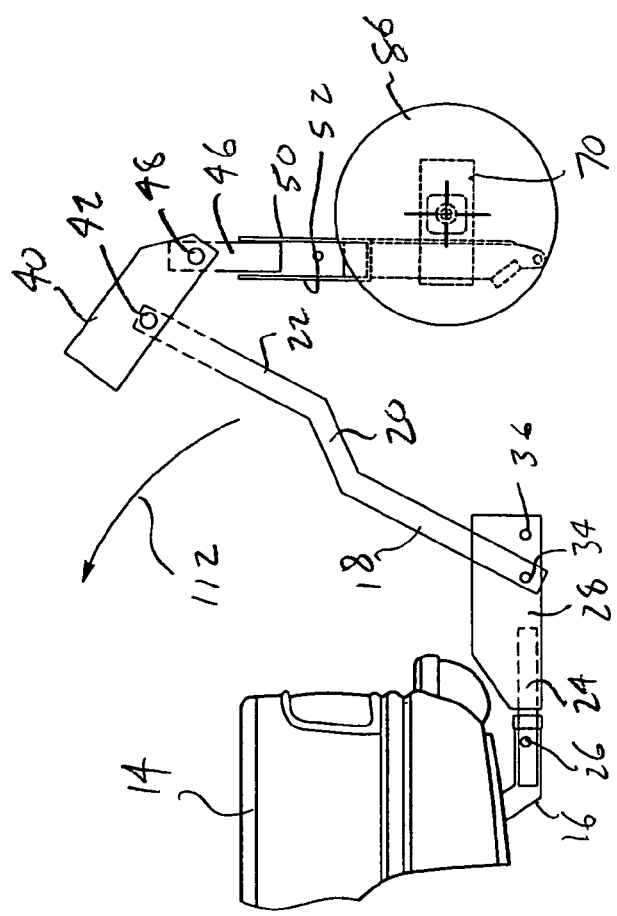
Fig-4D
Fig-4C

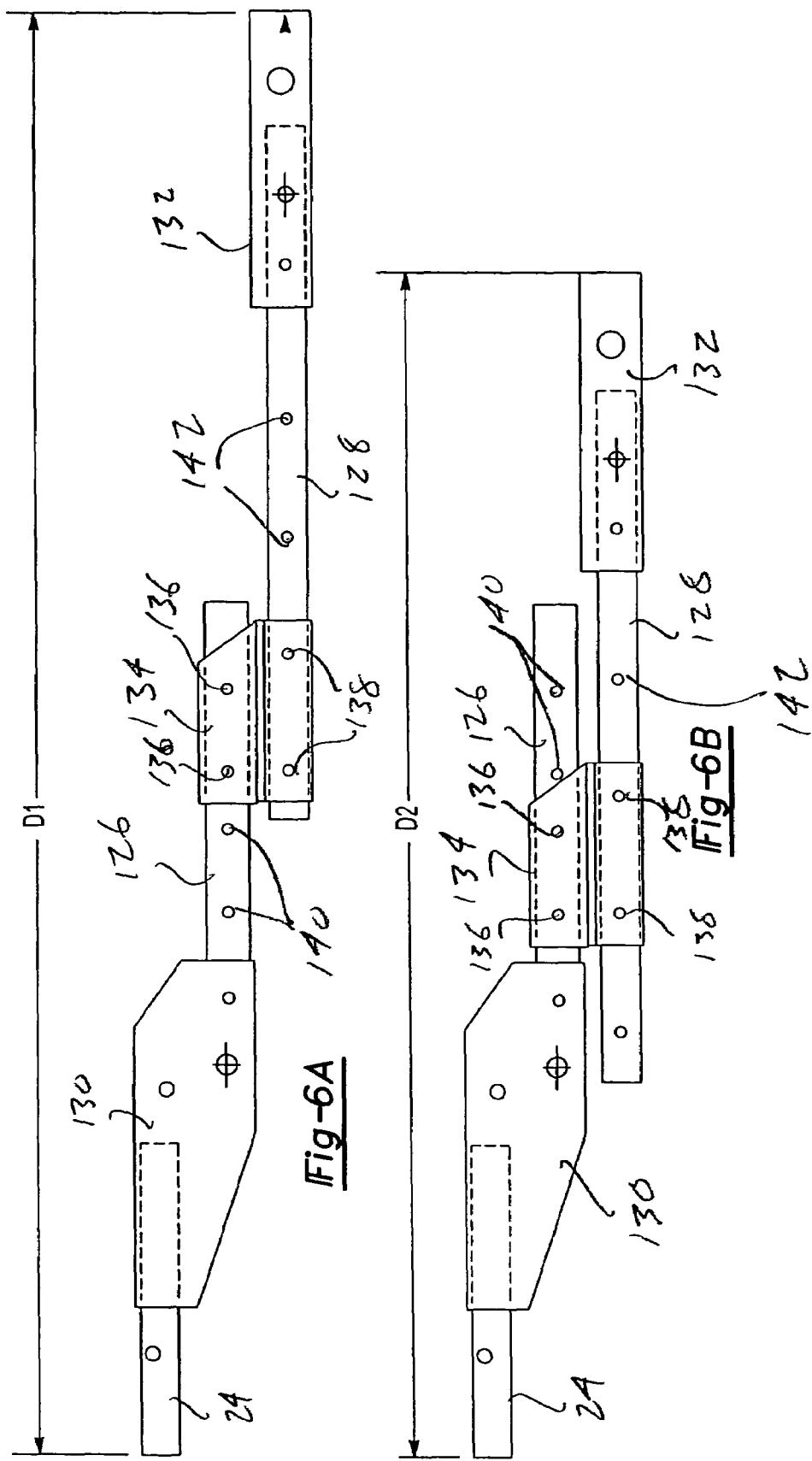

FOLD UP/FOLD DOWN TOW DOLLY FOR USE WITH A LOAD BEARING VEHICLE HITCH

BACKGROUND OF THE INVENTION

1. Field of the Invention

The present invention relates generally to tow dolly designs secured to a rear hitch associated with a tow vehicle (typically truck, camper/RV or the like). In particular, the present invention discloses an articulated tow dolly, capable of being converted from a normal use position to a retracted or "fold up" position, and by which the tow dolly wheels are elevated off of the ground and the assembly supported in elevated fashion by the vertical load carrying capability of the heavy-duty hitch assembly.

2. Description of the Prior Art

The prior art is well documented with examples of tow dolly and related trailer designs. The objective in many instances is to facilitate the storage of the dolly or trailer when not in use when being towed behind a vehicle.

A first example of a tow dolly design selected from the prior art is set forth in U.S. Pat. No. 5,342,162, issued to Robinette, and which teaches a tow dolly having both ramp loading and tilt loading capability. The dolly includes a vertical pivot bolt to allow the towed vehicle to be more easily maneuvered around turns. Additionally, the dolly has the capability to be folded to stand on its ramps, and thus assume a substantially upright configuration for storage.

U.S. Pat. No. 6,164,897, issued to Edwards, teaches another tow dolly design having ramps for receiving wheels of the vehicle being towed, the ramps being adjustably mounted such that vehicles of different wheel spacing between the front and/or rear wheels may be accommodated. The wheel assemblies are also adjustably mounted to accommodate either a narrow width vehicle or a wide width vehicle. Additionally, multiple bores are provided in the main frame to accommodate the two mounting positions of the wheel ramps to accommodate the mounting of the axle assemblies in the two positions.

Referring further to Hull, U.S. Pat. No. 5,727,920, a vertical lift towing dolly is disclosed and which includes variable, attachable platforms, each being individually designed for a specific purpose, e.g. hauling a boat, car, motorcycle and the like. A hydraulic cable system facilitates the vertical lift of the entire frame. Further, the design facilitates selective variation of the distance between the wheels, a towing tongue removably affixed to the axle, an arrangement to accept variable sized trailer hitches, to vary the height of the trailer, and to permit trailer disassembly for transport and storage.

U.S. Pat. No. 6,767,025, issued to Hagen, teaches a folding trailer for off-ground storage on a towing vehicle. A rectangular frame is mounted on a pair of wheels and a "T" shaped member. Hinged to a transverse cross brace which generally bisects the rectangular frame are two arms which terminate proximate to distal ends of the "T" shaped member. In the unfolded position, the leg of the "T" shaped member extends in front of the wheeled frame so as to define a tongue. When folded, the tongue extends generally perpendicularly to the wheeled frame and can be inserted directly into the hitch receiver, held there-within by a pin, and in order to allow the two wheels to ride free above the ground.

U.S. Pat. No. 6,623,028, issued to Johnston, teaches a stowable trailer/dolly system capable of being lifted from the ground and in order to be located beneath, or nest within, the chassis or sub-frame of a vehicle. When in use, the trailer/dolly is either coupled under a vehicle or trailer as a dolly only or is lowered and moved rearwardly of the vehicle so it can be towed behind the vehicle using the hitch. The chassis of the trailer/dolly is in the form of a rectangular frame which can be enlarged in size by telescopic movements of associated support members. Additional small wheels are provided on a sprung stub-axle.

U.S. Pat. No. 6,179,368, issued to Karlsson, teaches a modular fold-out camping unit designed to be carried largely by a vehicle's hitch receiver for transportation while independently supported to the ground with height adjustable legs while in use. A load-carrying base (or floor) plate is supported by a hitch arm. Additional floor boards may be provided and which are inter-attached to the floor plate by hinges to be unfolded to define an extended floor area whereupon an enclosure in the form of a semi-permanent tent structure is erected.

Finally, U.S. Pat. No. 3,877,714, issued to Black, teaches a trailer attachment for extending the effective length of a pickup truck box. A pair of eye bolts are secured to the floor of the pickup box adjacent to each side of the tailgate. The trailer includes a platform with apertures alignable with those associated with the eye bolts which are attached by removable pivots. The rear end of the platform has a castor wheel secured thereto to support its outer end and provide maneuverability thereto. The platform is fixed relative to the cargo box floor and to the extending portions of the elements which rest thereon.

SUMMARY OF THE PRESENT INVENTION

The present invention discloses a convertible tow dolly supported upon a hitch of a towing vehicle, such as a truck, RV or the like, and upon the tow dolly being converted from an engaged position to a folded/elevated and non-use position. The present invention provides for effective and secure support of the tow dolly when not in use and without the necessity of having to detach the dolly from the towing vehicle or the undesirable option of leaving the dolly in place and resulting from the wheels and frame bouncing uncontrollably along a road surface.

The dolly includes an elongated and heavy duty steel tubular support having a first end pivotally secured to a first bracket, in turn fixedly engaged to a drawbar associated with the hitch of extending from the towing vehicle. The elongated steel support defines an intermediate extending portion of the tow dolly assembly and which is capable of folding/articulating motion relative to the tow vehicle hitch.

A wheeled and crosswise extending portion exhibits a secondary bracket which is pivotally secured to a second end of the elongated tubular support, the tubular support being locked into position with both of the brackets, such as by insertion of clevis pins, and in order to prevent up and down articulation relative to the brackets and during supporting of the front or rear wheels of a towed vehicle secured upon the crosswise extending portion in a use position.

Upon removal of the pins, the assembly is permitted to fold inwardly about the first and second pivotal connections and in a direction towards the towing vehicle. In concurrent fashion, the construction of the elongated support is such that the wheels and associated crosswise extending portion elevate during final articulation of the elongated support to a subsequently locked and non-use position.

Additional features include the elongated intermediate support being subdivided into two telescoping sub-portions, these typically engaging at opposite, parallel spaced and overlapping ends through an intermediate and structurally reinforcing bracket. The bracket and overlapping tubular sub-portions may further include spaced apart and aligning apertures for adjusting an overall length of the tow dolly. In a preferred embodiment, a shortened length established by the sub-portions is desirable in a tow engaged position, whereby the overall length is maximized in order to permit the assembly to be articulated to the folded and non-use position whereby the assembly is secured in elevated and relatively flush fashion against the rear of the vehicle.

BRIEF DESCRIPTION OF THE DRAWINGS

Reference will now be made to the attached drawings, when read in combination with the following detailed description, wherein like reference numerals refer to like parts throughout the several views, and in which:

FIG. 3 is a side cutaway view, taken along line 3-3 of FIG. 2, with the tow dolly wheels removed for purposes of clarity of illustration, and further showing the ramp, fender and cross bar support portions associated with a towed vehicle wheel engaging locations, according to the present invention;

FIG. 4A is a slightly enlarged duplication of the view shown in FIG. 1, not showing either the towed vehicle or the ramp assemblies;

FIG. 4B illustrates an initial articulating/folding position of the tow dolly, and by which the ramp, fender and cross bar support portions shown in FIG. 3 are inwardly folded in a direction towards a likewise articulatingly supported intermediate extending portion according to the present invention;

FIG. 4C is a further succeeding articulating position of the components illustrated in FIG. 4B, in which the tow dolly wheels are elevated off of a ground surface and so that the entire assembly is supported by the towing vehicle drawbar;

FIG. 4D illustrates a fully articulated and storage position of the tow dolly at a rear elevated location and which is supported by the hitch drawbar of the towing vehicle;

FIG. 6A is a first sectional illustration of the lengthwise extending intermediate and end extending supports in a first extended position; and FIG. 6B is a succeeding sectional illustration of the elements shown in FIG. 6A in a telescopically collapsed and reduced length position associated with a vehicle tow condition.

DETAIL DESCRIPTION OF THE PREFERRED EMBODIMENTS

Figure 1:
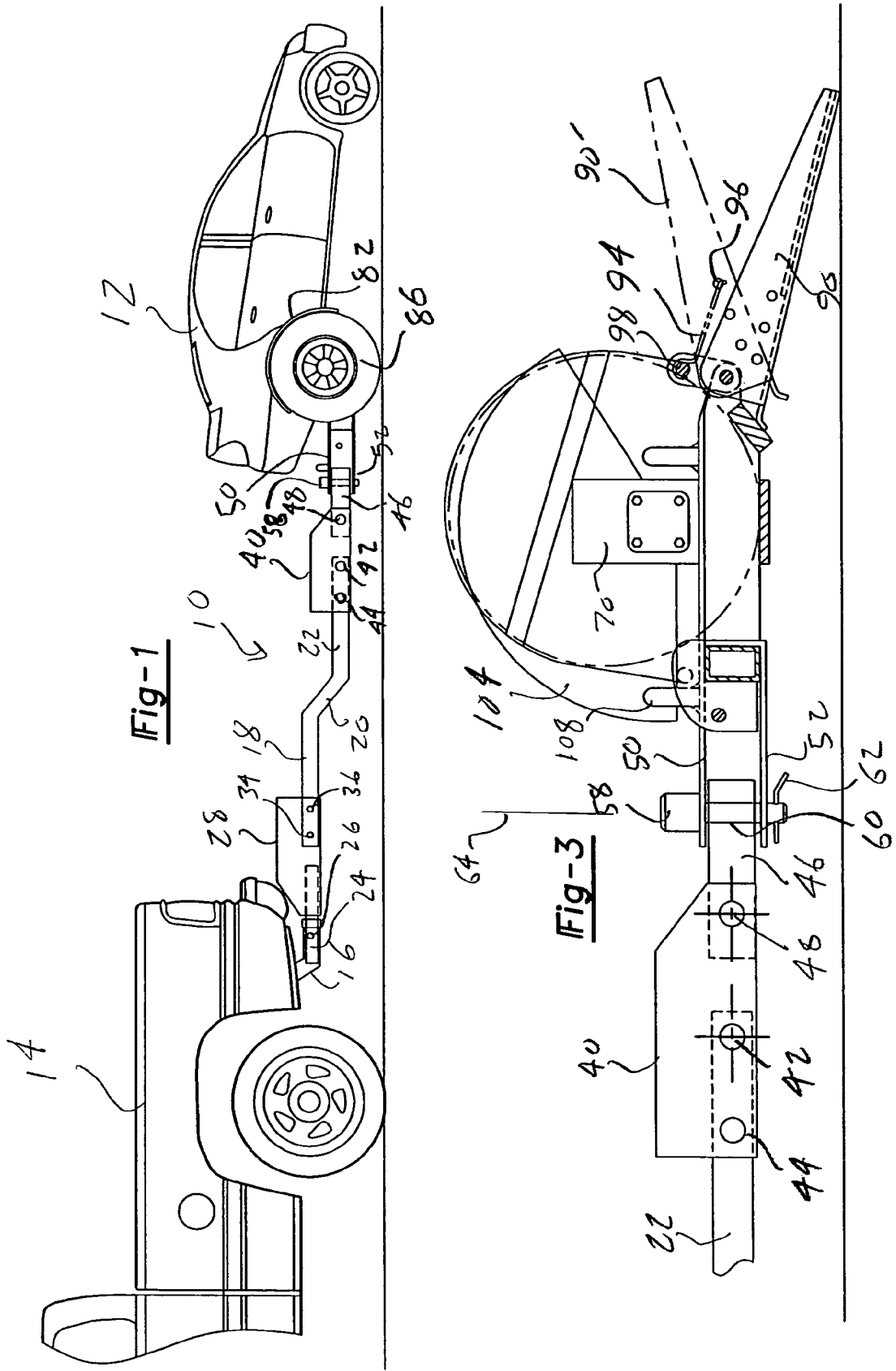
FIG. 1 is an environmental view illustrating the tow dolly in an engaged and use position for towing of a first vehicle by a second vehicle.

Referring now to FIG. 1, an environmental view is illustrated at 10 the tow dolly in an engaged and use position for towing of a first vehicle 12 by a second vehicle 14. In practice, the towing vehicle 14 is selected from any type of vehicle such as a truck (shown in FIG. 1), as well as an RV or any other suitable vehicle exhibiting the necessary towing characteristics and which in particular exhibits a rearwardly extending hitch 16 having heavy duty characteristics and which is welded, bolted or otherwise secured to a structural and load bearing underside of the vehicle 14.

As the present invention is directed to a tow dolly 10 which is articulated to an elevated and hitch supported non-use position, the hitch 16 and associated mounting location of the vehicle 14 must be capable of supporting and sustaining the weight, typically 300-400 lbs, exerted by the tow dolly. The towed vehicle 12 is further selected from any type of vehicle capable of being towed depending upon the sizing of the dolly 10 and the rated towing abilities of the tow vehicle 16.

In a first embodiment, as again shown in FIG. 1, the tow dolly 10 includes an elongated tubular extending portion, and such as may be constructed of a structural steel or like material capable of sustaining the load and weight requirements required during towing. The structural (intermediate) extending portion includes a first lengthwise extending leg portion 18, a middle and (downwardly/rearwardly) angled portion 20, and a rearwardly extending portion 22.

The configuration of the elongated structural member is both such that it reduces a height between the tow vehicle hitch 16 and dolly supporting location of the towed vehicle 12 and, as will be further described, assists in proper location and restraint in a direction against a rear side of the towing vehicle when articulated to the folded position. A drawbar 24 is adapted to being secured to the vehicle hitch 16, such as through the use of a pin (e.g. clevis pin and which is not shown) and which is inserted through aligning apertures, see further as collectively referenced at 26, established between the drawbar 24 and the hitch 16.

A forward end of the dolly 10 includes a first bracket 28 affixed to the drawbar 24. The bracket 28, as with the majority of the components associated with the tow dolly, is also constructed of a durable steel material and, as further viewed in FIG. 2, includes a forward tubular receiving portion, into which is engaged a rearwardly projecting end of the drawbar to be fixedly engaged by pin 30.

Figure 2:
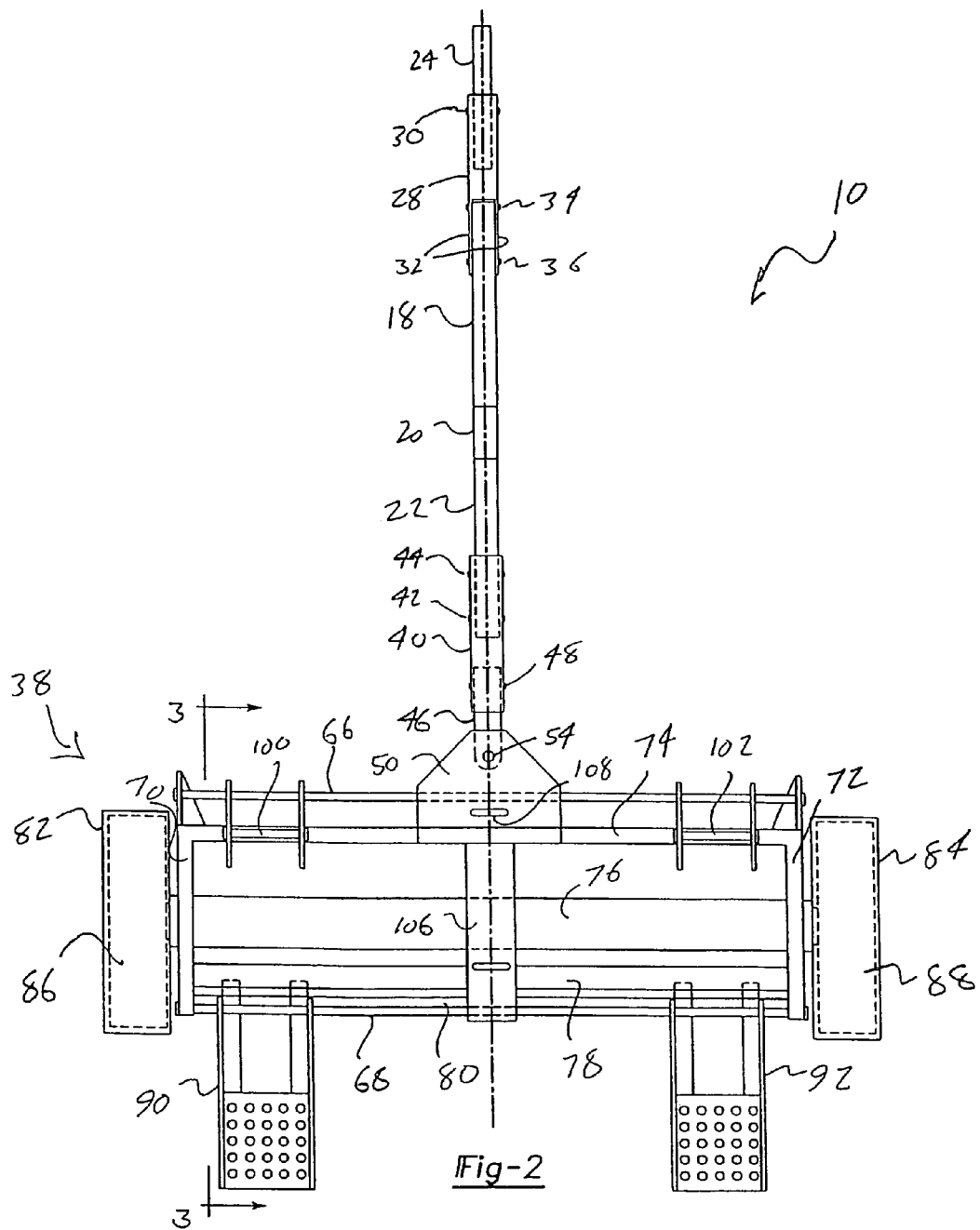
FIG. 2 is an overhead plan view of the tow dolly according to the present invention.

An opposite, rearward facing, end of the bracket 28 exhibits an upwardly open channel, see spaced apart and widthwise defining flange walls 32 in FIG. 2. A forward end of the first extending portion 18 of the elongated structural support is insertably engaged within the open rear channel of the bracket 28 in a normal operating condition, and further being fixed in place by the use of a pair of spaced apart pins and associated and aligning receiving holes, see as collectively referenced at 34 and 36 (as again best shown in FIG. 2) to lock the articulating structural member to the first bracket 28.

Referring again to the overhead plan view of FIG. 2, the tow dolly 10 further includes a wheel supported and crosswise extending portion, collectively referenced at 38 and as will be subsequently described in detail, is rotationally connected to an opposite end of the rearwardly extending portion 22 of the elongated (intermediate) structural support. A second bracket 40 is provided, much the same in construction as compared to the first bracket 28, and including a pair of spaced apart forward locations 42 and 44, which receive a corresponding rearward inserting end 22 of the structural support in likewise pin/aperture securing fashion.

As with the first bracket 28, the pair of pins 42 and 44 remain locked at the rear end, and in combination with the associated pair of pins 34 and 36 of the first bracket 28, in order to prevent undesirable up/down articulation of the elongated structural member during towing. As will be subsequently described, removal of a selected pin from each of the first 28 and second 40 brackets permits the elongated structural member to articulate to the upwardly displaced and inwardly folded storage condition.

A secondary drawbar portion 46 secures to a bottom surface opened and rearwardly extending portion of the secondary bracket 40, such as through a pin/aperture location 48. The crosswise extending portion 38 of the tow dolly further includes a pair of forwardly extending tow frame swivel joint attachments, see top 50 and bottom 52 spaced apart plate attachments in FIG. 5, along with aligning aperture 54 and 56, respectively.

A rotatable support coupling 58 extending between the pair of vertically spaced apart tow frame swivel joint attachments 50 and 52, and through the associated apertures 54 and 56 as well as an aligning aperture 60 defined in vertically extending fashion (see at 60 in FIG. 3) through the secondary drawbar 46, and which is positioned in inter-disposed and aligning fashion between the tow frame swivel attachments 50 and 52. A clevis pin 62 or the like (again FIG. 3) is provided to hold the coupling 58 in place and to permit rotation of the wheeled portion 38 relative to the elongated body and about a vertical axis (see at 64 in FIG. 3) extending through the support coupling 58.

Referring in more detail to the illustration of FIG. 2, as well as the succeeding illustrations, the crosswise extending portion 38 exhibits a generally rectangular frame shape, from which the spaced apart swivel joint attachments 50 and 52 project from a forward edge thereof. Specifically, the crosswise extending frame portion includes outer frame defining members including widthwise front 66 and spaced apart rear 68 supports which interconnect with end extending outer supports 70 and 72.

The interior structure of the frame further includes a series of spaced apart and widthwise extending structural supports 74, 76, 78 and 80 (again FIG. 2). These are arranged in a spatially desired fashion to provide a desired degree of structural support to the crosswise (tow vehicle supporting) portion of the tow dolly assembly. First and second end fenders 82 and 84, again FIGS. 1 and 2, secure to the crosswise extending end supports 70 and 72, and at least partially covering a pair of associated wheels 86 and 88 and which are rotatably supported to the corresponding end supports 70 and 72, respectively, and in order to define a common axis of rotation for the dolly assembly.

Additional features of the crosswise extending portion include a pair of ramp supports 90 and 92, these typically defining perforated steel plates, and which extend from first and second rear edge locations of the frame structure. The ramp supports 90 and 92 are each pivotally mounted to the associated rear widthwise extending member 68 and are pivotal between a lowered use position (i.e., to permit a tow vehicle to be driven up into engaging location upon the tow platform established by the frame structure) and an elevated storage position, such as further shown in FIG. 3 and by which a biasing metal spring clip or the like, see further at 94, is engaged both to a selected location 96 of the associated steel ramp plate (at 90 as shown), as well as to a further location 98 associated with a rear positioned bracket portion of the ramp structure, and in order to pivot the ramps 90 and 92 to an upper holding position after the tow vehicle wheels have been secured upon the platform.

A pair of tire abutment portions, see at 100 an 102 in FIG. 2, are shown in securing fashion along front edge locations (see as secured upon frontal proximate crosswise structural component 74) and in order to correspond to the lateral positioning of the ramps 90 and 92. In order to secure the tow vehicle 12 in place, tie-down straps or the like, see as shown at 104 in FIG. 3, are provided, as could be chains or other securing means (not shown). It is also envisioned that the ramps 90 and 92 and corresponding front edge tire abutment portions 100 and 102 are capable in certain embodiments to be laterally readjustable and in order to accommodate tow vehicles of different tire width.

Figure 5:
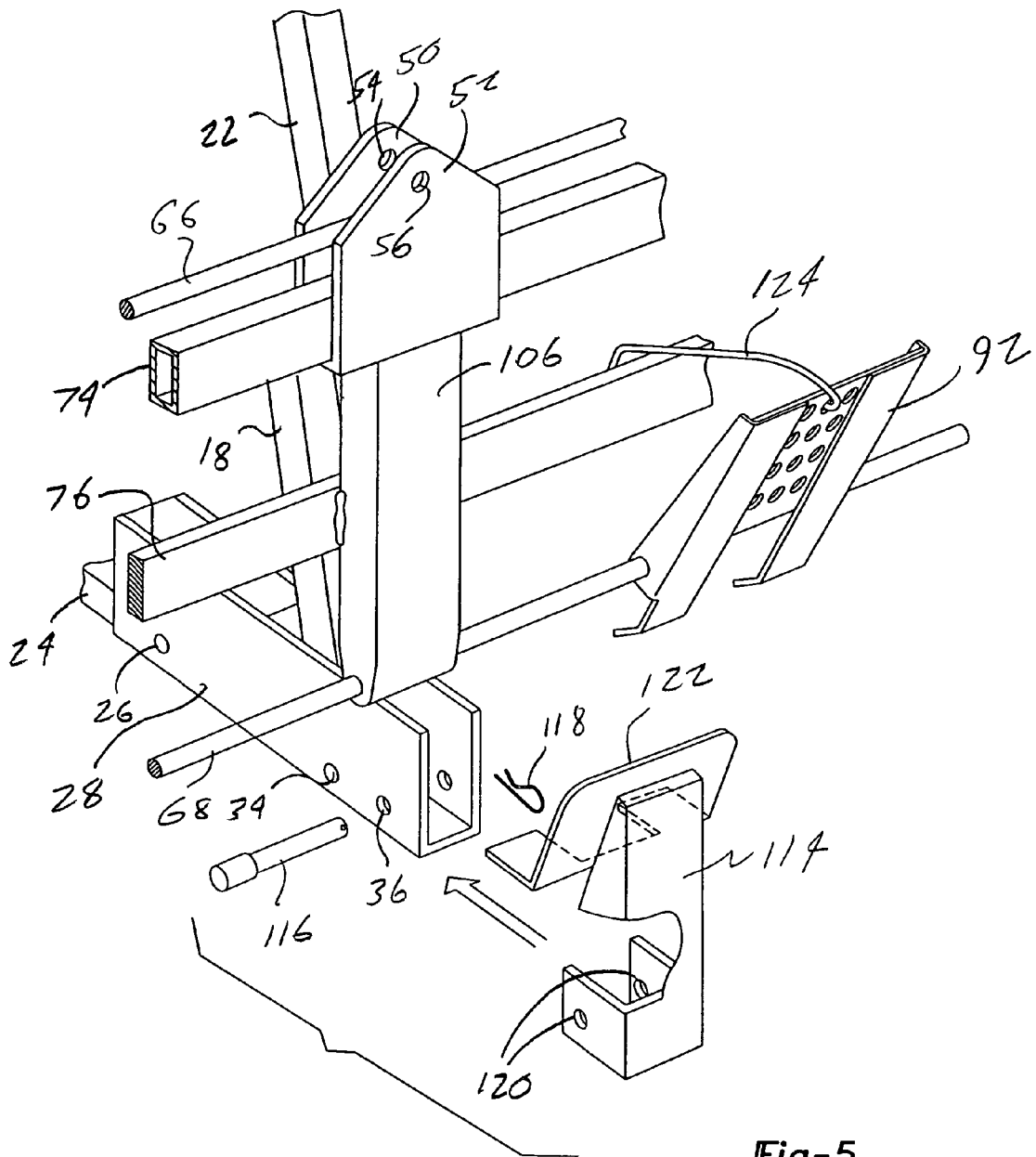
FIG. 5 is an exploded and perspective view of the fully articulated and storage position of the tow dolly shown in FIG. 4D, with certain components removed including the secondary pivoting bracket and associated drawbar, and also showing the restraining bar secured to the rear center support tube to prevent reverse articulating rotation of the tow dolly elements, in addition to the wire elements for securing the pivotal ramps.

Yet additional features associated with the tow platform include a central support portion 106 (see as best shown in FIGS. 2 and 5) extending between the front 66 and rear 68 locations associated with tow platform frame. As will be subsequently now described, the central support 104 facilitates secure locking of the tow platform upon articulating the assembly to the folded and elevated position.

A lifting handle 108, typically a "U" shaped gripping portion, extends upwardly from a surface of the upper of the swivel joint attachments 50. The handle 108 is utilized in such as a tow arrangement to receive a fastening end of the tie-down straps, see as again shown in FIG. 3, as well as to facilitate articulating folding motion of the tow assembly from the converted to stored (non-use) position as will now be described.

In particular, the tow vehicle 12 shown in FIG. 1 is first removed from atop the tow platform as illustrated in FIG. 4A. Note further that a number of the features associated with the tow platform assembly are removed in the succeeding illustrations of FIGS. 4A-4D and for purposes of ease of illustration.

Referencing further FIG. 4B, the handle 108 is grasped and pulled upward, resulting in the assembly undergoing initial articulation/folding in a direction, see arrow 110, towards the tow vehicle 14 and by the wheels 86 and 88 rolling inwardly along a ground surface. Articulating motion of the elongated structural support (see again as shown by interconnected elements 18, 20 and 22) is made possible by first removing pins 36 and 44 corresponding to the secondary engagement locations between the ends 18 and 22 of the elongated structural member and the first 28 and second 40 brackets, respectively.

FIG. 4C is a further succeeding articulating position (arrow 112) of the components illustrated in FIG. 4B, and in which the tow dolly wheels 86 and 88 are elevated off of the ground surface, such that the weight of the entire assembly is supported by the towing vehicle drawbar 24 and hitch 16. This in effect occurs because the overall length of the elongated intermediate structural member is greater than that of the tow platform assembly 38, resulting in the elevation of the platform beyond a given intermediate articulating position.

Referencing now FIG. 4D, a fully articulated and storage position of the tow dolly is established at a rear elevated location, and which is supported by the hitch drawbar of the towing vehicle. In order to lock the tow platform into place (in a non-rotating and reverse unfolding preventative fashion) a tubular shaped and upwardly extending restraint member 114 is secured to the rearward pin apertures 36 associated with the first drawbar bracket 28. See also pin 116 and clip 118 which engage through aligning locations of the bracket holes 36 and corresponding apertures 120 defined through welded end-flanges of the restraint member 114.

Upon being supported in place, the restraint member includes an upper welded flange component 122 which abuttingly engages against a lower edge location of the central support portion 106, in its folded position and to again prevent either articulating unfolding or rotation (yawl) of the tow support platform in its elevated and locked position. Referring again to FIG. 5, additional features include the provision of a wire holding clip (or other element) 124 for securing at opposite ends to the pivotal ramps 90 and 92 and locations along a widthwise extending support (see at 76) to prevent the ramps from uncontrollably rotating during storage transport upon the (otherwise) towing vehicle 14.

Referring finally to FIGS. 6A and 6B, first and second sectional illustrations are shown of a modified variant of a lengthwise extending intermediate and end extending support in both a first extended position and a second telescopically collapsed and reduced length position according to the present invention. In this variant, the elongated intermediate support is subdivided into two telescoping sub-portions 126 and 128 securing to modified versions 130 and 132 of first and second articulating brackets.

Opposing and overlapping portions of the subdivided structural components 126 and 128 engaging in parallel spaced fashion through an intermediate and structurally reinforcing bracket 134. As shown, the bracket 134 and overlapping tubular sub-portions 126 and 128 each further include spaced apart and aligning apertures, see as shown by upper 136 and lower 138 apertures aligning with corresponding upper and lower receiving channels formed in bracket 134, as well as further by lengthwise apertures 140 and 142 defined in the structural sub-components 126 and 128, respectively.

In this fashion, pins (not shown) are utilized for adjusting an overall length of the tow dolly from a lengthened version (D1) in FIG. 6A to a shortened/collapsed version (D2) in FIG. 6B. In a preferred embodiment, a shortened length (D2) established by the sub-portions is desirable in a tow engaged position, whereby the overall length is maximized (D1) in order to permit the assembly to be articulated to the folded and non-use position whereby the assembly is secured in elevated and relatively flush fashion against the rear of the vehicle.

Having described my invention, other and additional preferred embodiments will become apparent to those skilled in the art to which it pertains, and without deviating from the scope of the appended claims.

I claim:

1. A tow dolly supported upon a towing vehicle, comprising:
    a first bracket secured to a hitch associated with a towing vehicle, a first pivoting connection established between said bracket and a first end of an elongate extending portion;
    a wheeled tow platform secured to a second end of said extending portion, said tow platform supporting a towed vehicle when in a use position;
    said extending portion and tow platform being folded about said pivoting connection established with said first bracket, and in a direction towards the towing vehicle, concurrent with elevating the tow platform to a non-use position; and
    a widthwise aperture formed through a rearmost location of said first bracket, and a pin inserted through said aperture that prevents articulation of said elongate extending portion when said tow platform is in the use position.

2. The tow dolly as described in claim 1, a drawbar adapted to being secured to the vehicle hitch and to which is affixed said first bracket, said first bracket exhibiting a channel for permitting articulating motion of said extending portion.

3. The tow dolly as described in claim 2, said tow platform comprising a second bracket to which said extending portion is pivotally engaged at a second pivoting connection.

4. The tow dolly as described in claim 3, said second bracket further comprising a widthwise aperture formed through a forwardmost location thereof as well as through an aligning location of said extending portion positioned forward the second pivoting connection, a pin inserting through said aligning aperture to prevent up and down articulation in the use position.

5. The tow dolly as described in claim 1, said tow platform exhibiting a crosswise extending portion further comprising a pair of ramp supports extending from first and second rear edge locations thereof, said ramp supports each being pivotal between a lowered use and an elevated storage position.

6. The tow dolly as described in claim 2, said tow platform further comprising a frame exhibiting at least one widthwise extending structural support.

7. The tow dolly as described in claim 6, further comprising first and second end fenders secured to said tow platform and at least partially covering a pair of wheels securing at opposite ends of said platform.

8. The tow dolly as described in claim 3, further comprising a lifting handle extending from said second bracket.

9. The tow dolly as described in claim 6, further comprising a central support portion extending between front and rear locations associated with said frame, a restraint member connecting to said first bracket, upon said extending portion and tow platform being folded to the non-use position, and contacting said central support portion to prevent unfolding.

10. The tow dolly as described in claim 9, said restraint member further comprising a welded end-flange for engaging a lower edge location of said central support portion in the folded position.

11. The tow dolly as described in claim 9, further comprising a widthwise aperture formed through a rearmost location of said first bracket, a clevis pin inserting through said aperture as well as apertures defined in first and second spaced apart and aligning bracket portions associated with said restraint member.

12. The tow dolly as described in claim 1, said dolly exhibiting a substantially "T" shape in plan view, said elongated body and wheeled tow platform further comprising a structural steel composition.

13. The tow dolly as described in claim 3, further comprising a rotatable support coupling extending between a pair of vertically spaced apart tow frame swivel joint attachments associated with said tow platform and a secondary drawbar inter-disposed between said tow frame attachments, to permit rotation of said wheeled portion relative to said elongate extending portion and about a vertical axis extending through said support coupling.

14. The tow dolly as described in claim 5, further comprising a pair of tire abutment portions positioned along front edges of said tow platform and corresponding to said rear edge extending ramp supports.

15. A convertible tow dolly capable of being supported upon a towing vehicle, comprising:
    an elongated tubular support having a first end pivotally secured to a first bracket fixedly engaged to a hitch associated with a towing vehicle; and
    a wheeled tow platform exhibiting a secondary bracket to which is pivotally secured a second end of said elongated tubular support so as to exhibit a substantially T-shape in plan view, said elongated tubular support and said wheeled tow platform further exhibiting a structural steel composition;
    said elongated support being locked into position to prevent up and down articulation relative to said first and second brackets and for supporting a towed vehicle in a use position and further including each of said first and second brackets having a widthwise aperture formed through a location thereof as well as through an aligning location of each of said first and second extending ends of said elongated tubular support, a pin inserting through each aligning aperture; and said elongated support being unlocked at said first and second brackets by the removal of said pins to permit folding about said first and second pivotal connections and in a direction towards the towing vehicle, concurrent with elevating said wheeled tow platform to a subsequently locked and non-use position.

16. A convertible tow dolly, comprising:

an elongated body having a first end pivotally secured to a first bracket fixedly engaged to a hitch associated with a towing vehicle;

a wheeled tow vehicle support portion exhibiting a secondary bracket which is pivotally secured to a second end of said elongated body and for supporting a towed vehicle in a use position, a lifting handle extending from said second bracket; and said elongated body being articulated so as to be capable of being folded in a direction towards the towing vehicle, concurrent with elevating said wheeled tow vehicle support portion relative to a ground surface, said elongated body and tow vehicle support portion being locked in an elevated and non-use position.

\* \* \* \* \*

UNITED STATES PATENT AND TRADEMARK OFFICE
CERTIFICATE OF CORRECTION

| | | |
|---|---|---|
| PATENT NO. | : 7,584,980 B2 | Page 1 of 1 |
| APPLICATION NO. | : 11/391602 | |
| DATED | : September 8, 2009 | |
| INVENTOR(S) | : Michael Thompson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 749 days.

Signed and Sealed this

Fourteenth Day of September, 2010

David J. Kappos
*Director of the United States Patent and Trademark Office*